United States Patent [19]

Garvey et al.

[11] Patent Number: 4,741,843
[45] Date of Patent: May 3, 1988

[54] FLUID LOSS CONTROL ADDITIVES AND DRILLING FLUIDS CONTAINING SAME

[75] Inventors: Christopher M. Garvey, Wilmington, Del.; Arpad Savoly, Martinsville; Albert L. Resnick, Edison, both of N.J.

[73] Assignee: Diamond Shamrock Chemical, Dallas, Tex.

[21] Appl. No.: 913,133

[22] Filed: Sep. 26, 1986

[51] Int. Cl.$^4$ ............................................. C09K 7/02
[52] U.S. Cl. ................................. 252/8.514; 252/8.51
[58] Field of Search ................... 252/8.51, 8.511, 8.514

[56] References Cited

U.S. PATENT DOCUMENTS

| | | | |
|---|---|---|---|
| 2,650,905 | 9/1953 | Fordyce et al. | 252/8.51 |
| 2,718,497 | 9/1955 | Oldham et al. | |
| 2,802,783 | 8/1957 | Weiss et al. | |
| 4,293,427 | 10/1981 | Lucas et al. | |
| 4,309,523 | 1/1982 | Engelhard et al. | |
| 4,502,965 | 3/1985 | Giddings et al. | 252/8.51 |
| 4,652,623 | 3/1987 | Chen et al. | 252/8.51 X |

Primary Examiner—Herbert B. Guynn
Attorney, Agent, or Firm—Ernest G. Szoke; Henry E. Millson, Jr.; Neal T. Levin

[57] ABSTRACT

Drilling fluid compositions and methods of using such compositions in oil, gas and water well drilling fluid operations to reduce fluid loss from the composition to the formation are disclosed. Such compositions incorporate a terpolymer formed from (a) a vinyl containing alkyl or aromatic substituted sulfonate selected from the group consisting of 2-acrylamido, 2-methyl propane sulfonic acid (AMPS), sodium vinyl sulfonate or vinyl benzene sulfonate, and method salts thereof at about 10 to 75 weight percent in the polymer; (b) an unsaturated polybasic acid such as itaconic acid at about 1 to 60 weight percent; and metal salts thereof and (c) a non-ionic monomer selected from the group consisting of acrylamide, N, N-dimethylacrylamide, N-vinyl pyrrolidone, N-vinyl acetamide, or dimethylamino ethyl methacrylate and metal salts thereof at about 10 to 76 weight percent.

The terpolymer should have a molecular weight between 200,000 to 1,000,000. The preferred terpolymer comprises AMPS, acrylamide and itaconic acid. The polymers are used as fluid loss control additives for aqueous drilling fluids and are particularly advantageous when used with lime or gypsum based drilling muds containing soluble calcium ions.

18 Claims, No Drawings

FLUID LOSS CONTROL ADDITIVES AND DRILLING FLUIDS CONTAINING SAME

BACKGROUND OF THE INVENTION

1. Field of the Invention

The present invention relates to an aqueous drilling fluid composition and method of using same in drilling oil and gas wells and the like. More particularly, the present invention concerns incorporation of at least water dispersible terpolymers or salts thereof prepared in part from a monomer which is an unsaturated polybasic acid as a fluid loss control additive in a drilling fluid used in drilling wells in subterranean formations.

2. Description of Prior Art

Rotary systems are generally used in drilling oil and gas wells. These systems depend upon rotation of a drill pipe, to the bottom of which is attached to a drill bit. The bit cuts into the formation causing the cuttings to accumulate as drilling continues. A drilling fluid is used which lubricates the drill bit and carries cuttings to the surface for removal. This allows the bit to continue functioning and the bottom hole to be clean and free of cuttings. The drilling fluid also is the source of pressure which is exerted against the formation. Even in other drilling systems, drilling fluids still are needed to remove bore hole cuttings and to otherwise perform functions related to drilling fluids.

Oil and gas producing formations are generally porous layers having varying degrees of permeability to the flow of fluids such as oil, water or gas. When drilling through such porous formations, it is essential to employ drilling fluids having characteristics such that excessive amounts of the drilling fluid do not penetrate the porous formation. Drilling fluids have a tendency to penetrate the formation because the pressure in the bore hole is greater than the pressure opposing it which comes from the formation. Should excess penetration occur, there is loss of drilling fluid into the formation resulting in loss of pressure, and the inability to drill and remove cuttings.

There are typically three types of drilling fluids: (1) water-base (2) hydrocarbon or oil base emulsion and (3) air, mist or foam. Combinations are also used. With each of these types of drilling fluids (or muds) there are numerous systems or variations. The type of drilling fluids selected depends on geological and temperature environment and other performance and economic criteria.

Water base drilling fluids (or muds) usually contain water as the main component, a pH control agent (NaOH, KOH, etc.) a weighting agent (barite, hematite, calcium carbonate, etc.) a viscosifier (bentonite clay, attapulgite clay, high molecular polyacrylate/acrylamide, etc.) and a dispersant (lignite, lignosulphonate, modified tannin, low molecular weight polyacrylate, etc.).

Other additives can be used to impart desired chemical or physical properties to these water base fluids to enhance positive interaction to the geological formation. For example, NaCl salt is used to saturate the aqueous phase of the mud if a salt formation is to be diluted. This has the positive effect of decreased hole wash out and increased well life due to good cement bonding.

Lime, calcium hydroxide, can be added to a drilling fluid to obtain certain properties in limestone or hydratable shale formations. Lime drilling fluid (or mud) systems are characterized by having a very high pH (11-12.5) and a saturated aqueous phase with respect to calcium hydroxide with an excess of undissolved calcium hydroxide.

The lime drilling fluid systems may or may not incorporate potassium hydroxide as an inhibiting additive. Calcium is incorporated in these lime drilling fluids (or muds) to chemically obtain a desired rheological yield point, gel strengths and shale stability. Potassium can be added to supplement shale stabilization and is believed to control and stabilize clays not geometrically suitable for the large hydrated calcium ion. Calcium is believed to base exchange and convert sodium hydrated shales to divalent, calcium shales. Clay platelets are dehydrated, thereby increasing a high solids content with minimum viscosity and gel strengths to the mud.

Gypsum, calcium sulfate, can also be added to drilling fluids to obtain certain properties in anhydrite and hydratable shale formations. These "gyp" muds are similar to lime base muds with respect to their soluble calcium shale stabilization mechanisms. However, "gyp" muds differ from "lime" muds in that "gyp" muds have a lower pH (9-10.5) and higher soluble calcium content due to these pH changes.

These "lime" and "gyp" muds are significantly different than typical freshwater drilling fluids (or muds) contaminated with calcium. In freshwater drilling fluids (or muds), typical contaminates are drilled into, or contact the fluid as the result of the drilling operation and are not purposefully added to or incorporated into the fluid system. These freshwater muds will have a lower calcium concentration in solution. U.S. Pat. No. 2,802,783 to W. J. Weiss et al. describes a lime drilling fluid which has been used successfully for drilling heavy shale formations in the Gulf Coast Region. Holt et al., "The Use of Potassium-Lime Drilling Fluid Systems in the Navarin Basin Drilling", Society of Petroleum Engineers (SPE) Paper No. 14755, presented at the IADC SPE Conference, Dallas, Tex., Feb. 10-12, 1986; and Fleming, "Moderate pH, Potassium, Polymer-Treated Mud Reduces Washout", SPE Paper No. 14758, presented at the IADC SPE Conference, Dallas, Tex., Feb. 10-12, 1986, each describe lime mud formulations which have been employed successfully in oil and gas exploration.

Various materials have been added to "lime" and "gyp" muds to control fluid loss and have included materials such as pre-gelatinized starch; sodium carboxymethyl cellulose; copolymers of (1) a (meth)acrylamido alkyl sulfonic acid, including 2-acrylamido-2-methyl-propane sulfonic acid (which is sold under the trademark "AMPS" by Lubrizol Corporation), and (2) a (meth)acrylamide or N-alkyl (meth)acrylamide or cross-linked copolymers thereof (see, U.S. Pat. No. 4,293,427 to Lucas et al.); polymers of AMPS and N-vinylamides (see, U.S. Pat. No. 4,309,523 to Engelhard et al.); polyacrylates (see, e.g., U.S. Pat. No. 2,718,497 to Oldham et al.); and lignites.

However, these materials have not been satisfactory. For example, polycrylate polymers lose their effectiveness in the presence of calcium ions. Where polyacrylates are added to fresh water muds, fluid loss can be reasonably controlled. However, where soluble calcium is present in the muds, particularly under conditions of high temperature and pressure, polyacrylates are not as effective in controlling fluid loss. Other known copolymers and terpolymers although effective

SUMMARY OF THE INVENTION

Drilling mud compositions for use in drilling operations are disclosed. More particularly, such compositions are comprised of water, a lime or gypsum based mud and terpolymers and alkali metal, ammonium or organic amine salts of terpolymers of an unsaturated polybasic acid monomer which are at least water dispersible. Such terpolymers and alkali metal, ammonium or organic amine salts thereof have been found to be outstanding fluid loss additives for such lime or gypsum based mud drilling compositions, especially under conditions of high temperature and pressure.

The terpolymers used in this invention are comprised of an unsaturated polybasic acid (1–60 weight percent), a nonionic monomer (10 to 76 weight percent) and a vinyl containing alkyl or aromatic substituted sulfonate selected from AMPS, sodium vinyl sulfonate and vinyl benzene sulfonate (10 to 75 weight percent). The terpolymers and alkali metal, ammonium or organic amine salts thereof used in the present invention are relatively stable to hydrolysis over a wide range of temperature and pH. They may be admixed in solid form with any dry oil field lime or gypsum based mud or may be added at the time the mud is being prepared. These terpolymers are added to water based drilling fluids or muds, which are then used in the conventional manner. Drilling fluids, particularly muds containing lime (as lime base muds) which contain these polymers are characterized by outstanding fluid loss and rheological properties when employed under conditions of high temperature and pressure, such as in excess of 300 F and 500 psi. "Gyp" based mud containing these terpolymers also are believed to be characterized by outstanding fluid loss and rheological properties under high temperature and pressure conditions. Additionally, methods of drilling a borehole penetrating an earthen formation by introducing such a lime or gypsum based drilling mud composition into the borehole are disclosed.

So that the above-recited features, advantages and objects of the invention, as well as others which will become apparent are attained and can be understood in detail, more particular description of the invention is set forth below with respect to typical embodiments thereof, but the described embodiments should not be considered limiting of its scope, for the invention may admit to other equally effective embodiments which will be apparent from the description to one of ordinary skill in the art.

DESCRIPTION OF THE PREFERRED EMBODIMENTS

The terpolymer used in the drilling mud compositions of this invention includes (1) an unsaturated polybasic acid monomer and alkali metal, ammonium or organic amine salts thereof;(2) a nonionic monomer selected from the group consisting of acrylamide, N,N-dimethylacrylamide, N-vinyl pyrrolidone, N-vinyl acetamide, dimethylamino ethyl methacrylate; and (3) a vinyl containing alkyl or aromatic substituted sulfonate selected from the group consisting of AMPS, sodium vinyl sulfonate and vinyl benzene sulfonate and metal salts thereof.

Suitable unsaturated polybasic acids include unsaturated dicarboxylic acids and tricarboxylic acids such as maleic acid (MA), fumaric acid (FA), citraconic acid (methyl maleic acid), mesaconic acid (methyl fumaric acid), itaconic acid (IA), glutaconic acid, 1-butene 2,3,4-tricarboxylic acid, aconitic acid (1,2,3-propenetricarboxylic acid), $\alpha, \alpha'$-dimethylmuconic acid and the like.

The range of the three components of the terpolymer is from about 1 to about 60 weight percent unsaturated polybasic acid, from about 10 to 76 weight percent nonionic monomer, and from about 10 to 75 weight percent vinyl containing alkyl or aromatic substituted sulfonate. Further, when such drilling mud compositions contain an alkali metal, ammonium or organic amine salt in an amount up to about 18% by weight of water; then a preferred ratio of monomers is about 20 to 30 parts by weight vinyl containing alkyl or aromatic substituted sulfonate, about 65 to 75 parts by weight nonionic monomer and 3 to 7 parts by weight of an unsaturated polybasic acid. The terpolymers have a weight average molecular weight of between about 200,000 and about 1,000,000, preferably between about 300,000 to about 700,000.

The terpolymers can be used in their free acid form or in the form of any partially or completely neutralized inorganic, organic amine or quaternary ammonium salt so long as they are at least water dispersible, i.e., water dispersible or water soluble. Examples are the sodium, potassium, ammonium, mono-, di-, and tri-,$C_1$–$C_4$ alkyl amine and mono-, di- and tri-, $C_2$–$C_4$ alkanolamine salts. They also can contain mixed sodium, potassium, ammonium, organic amine or quaternary ammonium cations in their partially or completely neutralized form. Also, the cation in the terpolymer may be dependent upon the pH of the drilling mud composition. For example, if the terpolymer is introduced into the drilling mud composition in its free acid form, as a result of the alkalinity of the drilling mud, it may actually be present in the drilling mud composition in the form of its partially or completely neutralized salt form.

The terpolymers of this invention can be prepared from their respective monomers by conventional polymerization procedures, viz., solution, emulsion or bulk polymerization in the presence of conventional free radical initiators. Such procedures are well documented in the literature and do not form a part of this invention.

Examples of terpolymers are (percents are weight percents):

sodium salt of the terpolymer of acrylamide (30%), AMPS (64%) and itaconic acid (6%);

sodium salt of the terpolymer of acrylamide (39%), AMPS (54%) and maleic acid (7%);

sodium salt of the terpolymer of acrylamide (40%); AMPS (55%) and glutaconic acid (5%);

sodium salt of the terpolymer of acrylamide (30%), AMPS (64%) and $\alpha, \alpha'$-dimethylmuconic acid;

potassium salt of the terpolymer of acrylamido (54%), AMPS (39%) and itaconic acid (7%);

potassium salt of the terpolymer of N,N-dimethylacrylamide (30%), sodium vinyl sulfonate (64%) and itaconic acid (6%);

potassium salt of the terpolymer of acrylamide (39%), AMPS (54%) and fumaric acid (7%);

free acid of the terpolymer of acrylamide (70%), AMPS (23%) and itaconic acid (7%);

free acid of the terpolymer of acrylamide (76%), AMPS (19%) and aconitic acid (5%);

free acid of the terpolymer of acrylamide (25%), AMPS (70%) and itaconic acid (5%);

diethanolamine salt of the terpolymer of N-vinyl acetamide (39%), AMPS (54%) and itaconic acid (7%);

diethanolamine salt of the terpolymer of N-vinyl pyrrolidone (40%), sodium salt of AMPS (55%) and citraconic acid (5%);

diethanolamine salt of the terpolymer of dimethylamino ethyl methacrylate (54%); AMPS (39%) and itaconic acid (7%);

trimethyl ammonium salt of the terpolymer of acrylamide (25%), AMPS (70%) and 1-butene 2,3,4-tricarboxylic acid (5%);

trimethyl ammonium salt of the terpolymer of acrylamide (70%), vinyl sulfonate (23%) and itaconic acid (7%);

trimethyl ammonium salt of the terpolymer of acrylamide (76%), AMPS (19%) and mesaconic acid (5%);

triethanolamine salt of the terpolymer of acrylamide (30%), AMPS (64%) and itaconic acid (6%);

triethanolamine salt of the terpolymer of N, N-dimethylacrylamide (40%), AMPS (55%) and itaconic acid (5%);

triethanolamine salt of the terpolymer of N,N-dimethylacrylamide (25%), vinyl benzene sulfonate (70%) and itaconic acid (5%);

monoethanolamine salt of the terpolymer of acrylamide (54%), AMPS (39%) and itaconic acid (7%);

monoethanolamine salt of the terpolymer of N,N-dimethylacrylamide (40%), vinyl benzene sulfonate (55%) and fumaric acid (5%); and monoethanolamine salt of the terpolymer of acrylamide (25%), AMPS (70%) and itaconic acid (5%).

The fluid loss additives of this invention will cause substantial reductions in the rate of water loss by filtration and in the rate of drilling fluids. They are easily mixable and result in good fluid loss control while still exhibiting good flow properties. Under API standards, excellent fluid loss control may be achieved by the addition of about 0.25 to about 6 pounds per barrel (ppb) of such fluid loss additive. Typically, a laboratory prepared sample of a lime mud can obtain a high temperature high pressure (HTHP) filtration at 300° F., after static aging at 300° F., a fluid loss of between and 30 cc/30 min. with a 2 to 6 ppb addition the fluid loss additive.

The polymeric additives of the present invention exhibit minimal viscosity effects on the fluid. Since the fluid loss additives do not substantially thicken the drilling fluid, this permits the use of increased amounts of fluid loss additives without significant thickening. Thus, the fluid loss additives of this invention have minimal detriment to rheology.

For a fuller understanding of the nature and advantages of this invention, reference may be made to the following examples. These, examples are given merely to illustrate the invention and are not to be construed in a limiting sense. All quantities, proportions and percentages are by weight and all references to temperature are ° F. unless otherwise indicated.

In the examples all references to pound per barrel of drilling fluid are to a 42 gallon barrel of the drilling fluid and shown as ppb. References to pounds per gallon of drilling fluid are shown as ppg. The following abbreviations are used in the examples:

AMD acrylamide
IA itaconic acid
DMAD N,N-dimethylacrylamide
NVP N-vinyl pyrrolidone
AA acrylic acid
MA maleic acid
FA fumaric acid
MAN maleic anhydride As pointed out above, "AMPS" is the trademark of Lubrizol Corporation for 2-acrylamido, 2 methyl propane sulfonic acid.

EXAMPLE I

Preparation of a Terpolymer of AMD, AMPS and IA Having a Weight Ratio of 40:55:5

Into a 1 liter resin flask fitted with a stirrer, condenser, thermometer, nitrogen inlet and d port for adding liquid is placed 425 g of deionize water, 200 g of a 50% solution of acrylamide, 276 g of a 50% solution of AMPS, 30 g of a 40% solution of disodium itaconate and 0.24 g of Versene 100. The solution is stirred and to it added 0.2 g of sodium hypophosphite dissolved in 16 g of deionized water. The solution is stirred, nitrogen introduced sub-surface and the solution then heated to 75° C. by means of an external heating jacket. A solution of 2.5 g of sodium persulfate in 50 g of deionized water is prepared and placed in a metering pump connected to the resin flask at the inlet port with a fine tygon tubing. The persulfate solution is added uniformly over a period of two hours, maintaining a temperature of 75° C.±2° C. by initially cooling and then warming. At the end of the persulfate addition, 75° is maintained for an additional one hour, the solution cooled to 40° C and discharged. The resulting product was a clear, light green-yellow liquid with a solids content of 25%. The viscosity, as measured on a Brookfield viscometer was 7,500 cps, spindle 3, speed 12. The pH of the solution was 7 to 7.6. The molecular weight of the polymer was about 500,000 as measured by GPC. The product was completely water miscible.

EXAMPLE II

Preparation of Terpolymer of AMD, AMPS and DMAD Having a Weight Ratio of 15:70:15

For comparison purposes, a terpolymer outside the scope of applicants' invention was prepared and tested. Into a 1 liter resin reaction flask fitted with a stirrer, thermometer, condenser, nitrogen inlet and a port for adding liquid, is placed 470.1 g of deionized water, 75.2 g of a 50% solution of acrylamide, 350 g of a 50% solution of AMPS, 37.6 g of N, N-dimethylacrylamide and 0.1 g of Versene 100. The solution is stirred and to it added a solution of 0.5 g of sodium hypophosphite dissolved in 16 g of deionized water. The solution is sparged sub-surface with nitrogen and then heated to 72° C. with an external heating jacket. A solution of 0.4 g of ammonium persulfate dissolved in 50 g of deionized water is prepared and placed in a metering pump connected to the flask at the inlet part with a fine bore tygon tubing. The persulfate solution is added uniformly to the flask over a period of three hours, maintaining a temperature of 72° C.±2° C. in the reactor by initially cooling and then warming. After the persulfate solution is added, the 72° C. temperature is maintained for an additional hour, then the solution is cooled to about 40 C and discharged. The resulting product was a clear, very pale yellow, viscous liquid with a solids content of 25%. The viscosity, as measured on a Brookfield viscometer, was 21,300 cps, spindle 4, speed 12. The pH of the solution was 3.0.

EXAMPLE IIIA

Preparation of Terpolymer of AMD, AMPS and IA Having a Weight Ratio of 39.1/53.9/7

19.7 parts by weight of a 50% solution of sodium AMPS, 8.9 parts by weight of a 53.2% solution of disodium itaconate and 5.1 parts by weight of water were placed in a vessel fitted with a stirrer and an external electrical heater. The contents were stirred and heated to 48° C. to 50° C. At temperature, 31.0 parts by weight of 2-acrylamido-2-methyl propane sulfonic acid (AMPS) was slowly added and stirred until essentially all of the AMPS was dissolved. 29.7 parts of acrylamide (AMD) was then slowly added with stirring. The temperature decreased to about 30° C. and was reheated to about 35° C. when a clear solution was obtained. The solution was cooled to about 25° C., placed in a reactor and polymerized adiabatically using sodium metabisulfite/ammonium persulfate catalyst. The resulting product, a white water soluble solid, had a molecular weight of 300,000 to 350,000.

EXAMPLES IIIB and IIIC

Preparation of Terpolymers

The procedure described in Example IIIA was repeated to prepare the following terpolymers useful as fluid additives for the drilling fluid composition in this invention:

(B) AMD, AMPS and MA in a weight ratio of 40:55:5

(C) AMD, AMPS and FA in a weight ratio of 40:55:5

In the above examples, the sodium salt of the IA, MA and FA was used in the product preparation.

The terpolymers can be used with a wide variety of water based drilling fluids such as clear drilling fluids, low solids, muds, bentonite and weighted muds. This additive is particularly effective in the above described lime based muds. These drilling fluids, including the muds and their preparation, are well known in the drilling art. For purposes of evaluation, the following procedures were used to test and prepare muds having the compositions set forth in Table I.

Procedure

The terms K and n are used in rheological Power Law Models. These terms are calculated from 600 RPM and 300 RPM Dial Readings taken with the direct indicting viscometer using the following formulas:

$$n = \frac{3.32 \times \log_{10} 600 \text{ RPM Dial Reading}}{300 \text{ RPM Dial Reading}}$$

$$K = \frac{(300 \text{ RPM Reading}) \times 1.066}{100 \times (511)^n}$$

The constant K is the value of the shear stress at a shear rate of 1 sec$^{-1}$. It is measured by extrapolating the straight line of the log of the shear stress versus the log of the shear rate between 10 and 100 sec$^{-1}$ back to the value of sec The exponent n is determined by measuring the slope of the curve when plotting the log of the shear stress versus the log of the shear rate between 10 and 100 sec$^{-1}$. The constant K is the consistency index, expressed in lb-sec$^n$/sq. ft. while n is a dimensionless flow behavior index.

The plastic viscosity, PV, is a measure of the internal resistance to fluid flow attributable to the amount, type and size of solids present in a given fluid. The value, expressed in centipoises, is proportional to the slope of the consistency curve determined in the region of laminar flow for materials obeying Bingham's Law of Plastic Flow. When using the direct indicating viscometer, the plastic viscosity is found by subtracting the 300 rpm reading corresponding to a shear rate of 511 sec$^{-1}$ from the 600 rpm reading corresponding to a shear rate of 1021 sec$^{-1}$.

The yield point, YP, also known as the yield value is the resistance to initial flow, or represents the stress required to start fluid movement. This resistance is believed to be due to electrical charges located on or near the surfaces of the particles. Values of yield point and thixotropy, respectively, are measurements of the same fluid properties under dynamic and static states. Bingham yield values reported in lb./100 sq. ft., are determined by using the direct-indicating viscometer and subtracting the plastic viscosity from the 300 rpm reading.

The gel strength is the ability or measure of the ability of a colloid to form gels as a function of time or thixotropy. It is believed to be a measure of the same interparticle forces of a fluid as determined by the yield point except that gel strength is measured under static conditions, yield point under dynamic conditions. The 10 second gel strength measurements are initial measurements. The 10 minute measurements are later measurements. The measured initial gel strength of a fluid is the maximum reading (deflection) taken from a direct reading viscometer after the fluid has been static for 10 seconds. This test procedure is described in API RP 13B. The 10 minute gel strength of a fluid is the maximum reading (deflection) taken with a direct reading viscometer after the fluid has been quiescent for ten minutes. Gel strength is a pressure unit measurement reported in lb./100 sq. ft.

The Fann viscometer (Model 35-A) Meter is a direct reading viscometer having an outer cylinder which can be rotated at 600, 300, 200, 100, 6 and 3 revolutions per minute (rpm). An inner, concentric cylinder is connected to a scale to permit the operator to read same. The readings at 600 rpm and 300 rpm are recorded. From these readings, plastic viscosity and yield point can be calculated.

The yield point is the parameter of particular interest to this invention. Generally, fluid loss agents do not lower yield points, but increase them. This then requires additional treatments of dispersants. This invention controls fluid loss and yield point.

Procedure

The following procedures may be utilized to evaluate salts of polymers as fluid loss additives in the mud formulations described hereinafter.

Summary of Preparation of Test Samples

I. Initial Procedure

A 350 ml sample of mud formulation is placed in a stainless steel beaker. With thorough mixing, the polymer is added slowly to the mud and mixed. Mud pH is monitored during mixing and adjusted if necessary. After mixing, viscosities and gel strength of the mud are measured using a Fann viscometer (Model 35-A). Plastic viscosity (PV), yield point (YP) and gel strengths at 10 second and 10 minute intervals are measured using API procedure RP13B.

II. Hot Rolled Procedure (a) After initial mixing and testing samples are placed in 16 oz. glass mason jars.

(b) The samples then are placed in a roller oven preheated to the desired heat aging temperature (150° F.) (dynamic heat aging) for 16 hours.

(c) At the end of the heat aging period, the jars are removed from the oven, cooled under cold running water, and the aged mud transferred into a stainless steel beaker.

(d) Mud pH is checked after hot rolling. Rheology and fluid loss measurements are made with Fann viscometer (Model 35-A).

III Static Aging Procedure (a) After hot rolling data is gathered, muds are remixed and placed into stainless steel aging cells and statically aged for 16 hours at the desired temperature. These cells are pressurized with nitrogen.

(b) At the end of the heat aging period, the aging cell is removed from the oven, cooled under cold running water, pressure released and the aged mud is transferred into a stainless steel beaker.

(c) Rheology and API fluid loss measurements are made using API procedure and equipment.

(d) HTHP test conditions are at 300° F. Pressure is set at 500 psi differential (600 psi at top, 100 psi back pressure at bottom). Total volume of filtrate collected after 30 minutes is recorded and multiplied by two.

IV. Dynamic Temperature Aging Tests (a) Premix fluid sample and Hot Roll at 150° F for 16 hours.

(b) Using the Fann Model 50C viscometer, place test sample in mud chamber and seal.

(c) Set the following parameters: RPM at 100 constant, pressure at 400 psi Range=10%

Time heat—room temperature to 350° F. over 130 minutes.

(d) Record viscosity and temperature on paper chart running at 2/10 inch/min.

The following mud formulations were prepared and tested using terpolymers within the outside the scope of applicants' invention. The procedures described herein were employed and the date obtained is summarized in Tables I, II and III below.

|  | ppb (or grams) |
|---|---|
| MUD FORMULATION I (A) (in order of addition) | |
| Base Slurry | |
| Fresh Water Slurry (22.5 ppb bentonite) | 318 |
| H$_2$O | 32 |
| Simulated drilled solids comprised of a blend of inert particles (Rev. Dust) (sold by Milwhite Co., Houston, Texas) Mix 10 minutes in Hamilton Beach mixer Hydrate Overnight. | 30 |
| Lime | 5 |
| Mor-Rex (Tradename for low molecular weight starch commercially available from Grain Processing Co., Muscatine, Iowa) | 3 |
| KOH | .5 |
| Barite | 200 |
| Test polymer Mix 10 minutes on Hamilton Beach mixer | 3 |
| MUD FORMULATION I (B) | |
| Lime Field Mud from offshore, Ventura, California | |
| MUD FORMULATION II | |
| Base slurry from Mud Formulation I | 175 |
| DI water | 105 |
| Lime | 5 |
| Mor-rex | 3 |
| 50% NaOH | 1 |
| Lignite | 4 |
| Barite | 370 |
| Mix for 10 minutes polymer Mix for 10 minutes | 3 |
| MUD FORMULATION III | |
| Prepare Mud I (without addition of polymer) Then add the following: | |
| Lignite | 2 |
| Ca$^{2+}$ Bentonite | 10 |
| Polymer | 3.0 |

(TABLE I)

| POLYMERS | PPB | MUD TYPE | Conditions of Exper. | FANN 35 READING @ RPM | | | | GEL STRENGTH | | | |
|---|---|---|---|---|---|---|---|---|---|---|---|
| | | | | 600 | 300 | 200 | 100 | 6 | 3 | 10" | 10 |
| Example I/MLTP | 3/1 | I (A) | 2 | 41 | 20 | 13 | 7 | 1 | 1 | 1 | 2 |
| | | | 3 | 50 | 25 | 17 | 9 | 2 | 1 | 1 | 3 |
| HDRL/MLTP | 3/1 | I (A) | 2 | 116 | 69 | 51 | 31 | 4 | 3 | 3 | 5 |
| | | | 3 | * | * | * | * | * | | | |
| EXAMPLE I/N-44 | 3/1 | I (A) | 2 | 46 | 23 | 16 | 9 | 2 | 1 | 2 | 6 |
| | | | 3 | 66 | 33 | 23 | 13 | 2 | 1 | 1 | 2 |
| BASE | 0 | I (A) | 2 | 51 | 28 | 20 | 11 | 3 | 1 | 2 | 28 |
| EXAMPLE I | | I (B) | 2 | 100 | 61 | 47 | 29 | 7 | 5 | 7 | 20 |
| HDRL | 2 | I (B) | 2 | 153 | 98 | 77 | 53 | 18 | 15 | 18 | 55 |
| BASE | 2 | I (B) | 2 | 47 | 25 | 12 | 7 | 2 | 1 | 3 | 6 |
| EXAMPLE I/MLTP | 2/1 | I (B) | 2 | 87 | 51 | 38 | 24 | 6 | 5 | 7 | 13 |
| HDRL/MLTP | 2/1 | I (B) | 2 | 150 | 94 | 72 | 47 | 13 | 11 | 13 | 28 |
| EXAMPLE I/44 | 2/1 | I (B) | 2 | 77 | 46 | 35 | 22 | 7 | 5 | 8 | 10 |

| POLYMERS | BINGHAM PLASTIC | | pH | API FL mls | HTHP 300 F. 30' | SHEAR | POWER LAW | |
|---|---|---|---|---|---|---|---|---|
| | PV | YP | | | | | n | K |
| Example I/MLTP | 21 | −1 | 11.5 | 7.2 | | | 1.04 | 0.0003 |
| | 25 | 0 | 11.3 | 12.8 | | 70 | 1.00 | 0.0005 |
| HDRL/MLTP | 47 | 22 | 11.5 | 6.0 | | | 0.75 | 0.0069 |
| | * | * | 10.8 | | | 1500 | ** | ** |
| EXAMPLE I/N-44 | 23 | 0 | 11.5 | 7.2 | | | 1.00 | 0.0005 |
| | 33 | 0 | 11.3 | 8.8 | | 90 | 1.00 | 0.0007 |
| BASE | 23 | 5 | 11.5 | 62.0 | | | 0.86 | 0.0014 |
| EXAMPLE I | 39 | 22 | 11.6 | 3.5 | 12.2 | | 0.71 | 0.0076 |

(TABLE I)-continued

| | | | | | | | | |
|---|---|---|---|---|---|---|---|---|
| HDRL | 55 | 43 | 11.8 | 3.4 | 14.0 | | 0.64 | 0.0190 |
| BASE | 22 | | 11.8 | 4.0 | 30.0 | | 0.91 | 0.0009 |
| EXAMPLE I/MLTP | 36 | 15 | 11.2 | 3.5 | 12.0 | | 0.77 | 0.0045 |
| HDRL/MLTP | 56 | 38 | 11.1 | 3.5 | 11.5 | | 0.67 | 0.0150 |
| EXAMPLE I/44 | 31 | 15 | 11.2 | 3.8 | 15.0 | | 0.74 | 0.0048 |

*Too thick to measure
**Cannot be calculated
MLTP—Milltemp Milpark, Houston, Texas, polymer dispersant
HDRL—Hostadril V2825, American Hoeschst, polymer for fluid loss
N-44—Nopcosperse-44, Diamond Shamrock polymer dispersant
2 = HOT ROLLED 150° F. 16 HOURS
3 = STATIC AGED 300° F. 16 HOURS Test results with mud formulation I(A) clearly indicate that when a terpolymer of this invention, such as the terpolymer of Example I, is used superior rheological properties are obtained. Comparing initial and hot rolled yield points and n and K numbers obtained with the Example I terpolymer to those obtained with Hostadril V2825, the terpolymer of Example I did not significantly increase the viscosity and provided good fluid loss control. In contrast, use of Hostadril V2825 resulted in significantly high initial rheologies and a hot rolled sample that would not break back into a fluid.

When tested in an actual field mud formulation I(B), Example I again showed superior rheology and equal fluid loss control when compared to Hostadril.

TABLE II

| 3 PPB MONOMBERS WEIGHT % Ratio(s) | Conditions of Exper. | FANN 35 READING @ RPM | | | | GEL STRENGTH | | | | BINGHAM PLASTIC | | | API FL mls | HTHP 300° F. 30' | POWER LAW | |
|---|---|---|---|---|---|---|---|---|---|---|---|---|---|---|---|---|
| | | 600 | 300 | 200 | 100 | 6 | 3 | 10" | 10 | PV | YP | pH | | | n | K |
| AMD/NVP | 1 | 55 | 30 | 20 | 12 | 3 | 2 | 3 | 20 | 25 | 5 | 12.0 | | | 0.8740 | 0.0014 |
| AA85/AMPS10/MAN5 | 1 | 100 | 56 | 42 | 26 | 5 | 3 | 5 | 19 | 44 | 12 | 12.0 | | | 0.8360 | 0.0032 |
| AMD30/AMPS68/ITA2 | 1 | 119 | 69 | 51 | 32 | 10 | 8 | 12 | 53 | 50 | 19 | 12.0 | | | 0.7858 | 0.0055 |
| AMD76/AMPS19/ITA5 | 1 | 130 | 75 | 55 | 35 | 10 | 8 | 12 | 56 | 55 | 20 | 12.0 | | | 0.7931 | 0.0057 |
| EXAMPLE I | 1 | 174 | 105 | 79 | 50 | 15 | 13 | 17 | 71 | 69 | 36 | 12.0 | | | 0.7283 | 0.0119 |
| HOSTADRIL | 1 | 230 | 145 | 112 | 72 | 17 | 12 | 17 | 68 | 85 | 60 | 12.0 | | | 0.6652 | 0.0244 |
| EXAMPLE II | 1 | * | 205 | 152 | 95 | 25 | 22 | 29 | 95 | ** | ** | 12.0 | | | ** | ** |
| AMD70/NVP30 | 1 | 232 | 166 | 135 | 103 | 52 | 50 | 52 | 91 | 66 | 100 | 12.0 | | | 0.4827 | 0.0872 |
| DRISPAC anionic cellulosic polymer | 1 | * | * | * | * | * | * | * | * | ** | ** | 12.0 | | | ** | ** |
| AMD40/AMPS55/AA5 | 1 | 217 | 117 | 84 | 50 | 10 | 9 | 12 | 50 | 100 | 17 | 11.9 | | | 0.8907 | 0.0049 |
| AMD50/AMPS50 | 1 | 158 | 89 | 64 | 40 | 10 | 9 | 11 | 45 | 69 | 20 | 11.9 | | | 0.8276 | 0.0054 |
| EXAMPLE III (B) | 1 | 166 | 100 | 73 | 44 | 10 | 7 | 7 | 25 | 66 | 34 | 11.9 | | | 0.7308 | 0.0112 |
| EXAMPLE III (C) | 1 | 208 | 133 | 102 | 68 | 30 | 20 | 18 | 130 | 75 | 58 | 11.9 | | | 0.6448 | 0.0254 |
| AA85/AMPS10/MAN5 | 2 | 52 | 25 | 17 | 10 | 2 | 1 | 10 | 3 | 27 | −2 | 12.0 | 3.0 | | 1.0560 | 0.0004 |
| EXAMPLE II | 2 | 85 | 46 | 35 | 20 | 5 | 4 | 6 | 10 | 39 | 7 | 11.9 | 3.0 | | 0.8853 | 0.0020 |
| AMD76/AMPS19/ITA5 | 2 | 204 | 120 | 85 | 50 | 6 | 4 | 5 | 10 | 84 | 36 | 12.0 | 3.0 | | 0.7651 | 0.0108 |
| AMD/NVP | 2 | 40 | 20 | 13 | 7 | 2 | 1 | 2 | 3 | 20 | 0 | 11.8 | 4.0 | | 0.9994 | 0.0004 |
| AMD70/NVP30 | 2 | 80 | 44 | 32 | 19 | 5 | 4 | 6 | 10 | 36 | 8 | 12.0 | 4.0 | | 0.8620 | 0.0022 |
| EXAMPLE I | 2 | 105 | 60 | 43 | 25 | 7 | 5 | 6 | 10 | 45 | 15 | 12.0 | 4.0 | | 0.8069 | 0.0042 |
| HOSTADRIL | 2 | 137 | 79 | 57 | 34 | 7 | 5 | 7 | 11 | 58 | 21 | 11.8 | 4.0 | | 0.7938 | 0.0060 |
| DRISPAC anionic cellulose polymer | 2 | * | * | * | * | * | * | * | * | * | * | 11.9 | 4.0 | | ** | ** |
| AMD30/AMPS68/ITA2 | 2 | 69 | 37 | 27 | 17 | 4 | 3 | 5 | 8 | 32 | 5 | 11.8 | 5.0 | | 0.8985 | 0.0015 |
| EXAMPLE III (B) | 2 | 105 | 57 | 40 | 22 | 3 | 2 | 2 | 15 | 48 | 9 | 11.4 | 4.2 | | 0.8808 | 0.0025 |
| AMD50/AMPS50 | 2 | 121 | 65 | 47 | 26 | 3 | 3 | 3 | 10 | 56 | 9 | 11.5 | 5.2 | | 0.8960 | 0.0026 |
| AMD40/AMPS55/AA5 | 2 | 147 | 78 | 55 | 32 | 5 | 3 | 5 | 10 | 69 | 9 | 11.5 | 5.0 | | 0.9137 | 0.0028 |
| EXAMPLE III (C) | 2 | 125 | 72 | 53 | 31 | 4 | 3 | 3 | 50 | 53 | 19 | 11.5 | 5.5 | | 0.7954 | 0.0054 |
| EXAMPLE I | 3 | 103 | 58 | 40 | 23 | 3 | 2 | 4 | 4 | 45 | 13 | 12.0 | 3.5 | 19 | 0.8280 | 0.0035 |
| HOSTADRIL | 3 | 178 | 109 | 80 | 44 | 8 | 6 | 8 | 14 | 69 | 40 | 11.8 | 4.5 | 19 | 0.7071 | 0.0141 |
| AMD30/AMPS68/ITA2 | 3 | 93 | 50 | 35 | 20 | 3 | 2 | 4 | 4 | 43 | 7 | 11.8 | 5.5 | 28 | 0.8948 | 0.0020 |
| EXAMPLE II | 3 | 83 | 42 | 30 | 19 | 4 | 3 | 15 | 19 | 41 | 1 | 11.90 | 8.0 | 40 | 0.9822 | 0.0010 |
| DRISPAC anionic cellulose polymer | 3 | 176 | 107 | 77 | 47 | 10 | 7 | 13 | 35 | 69 | 38 | 11.9 | 5.5 | 40 | 0.7175 | 0.0130 |
| AMD76/AMPS19/ITA5 | 3 | 99 | 54 | 40 | 23 | 4 | 3 | 5 | 3 | 45 | 9 | 12.0 | 4.0 | 52 | 0.8740 | 0.0025 |
| AA85/AMPS10/MAN5 | 3 | 70 | 34 | 23 | 13 | 3 | 1 | 4 | 3 | 36 | −2 | 12.0 | 4.0 | 57 | 1.0412 | 0.0005 |
| AMD70/NVP30 | 3 | 79 | 41 | 19 | 16 | 3 | 2 | 4 | 4 | 38 | 3 | 12.0 | 5.0 | 68 | 0.9457 | 0.0012 |
| AMD50/AMPS50 | 3 | 78 | 42 | 30 | 16 | 2 | 1 | 2 | 3 | 36 | 6 | 11.4 | 7.0 | 60 | 0.8926 | 0.0017 |
| EXAMPLE III (C) | 3 | 93 | 51 | 35 | 20 | 3 | 2 | 2 | 3 | 42 | 9 | 11.4 | 7.0 | 28 | 0.8662 | 0.0025 |
| EXAMPLE III (B) | 3 | 93 | 52 | 37 | 21 | 3 | 2 | 2 | 3 | 41 | 11 | 11.4 | 5.4 | 26 | 0.8382 | 0.0030 |
| AMD40/AMPS55/AA5 | 3 | 120 | 75 | 53 | 30 | 3 | 2 | 5 | 10 | 45 | 30 | 11.4 | 5.0 | 20 | 0.6777 | 0.0117 |

*cannot be measured
**cannot be calculated
1 = INITIAL
2 = HOT ROLLED 150° F.
3 = STATIC AGED 300° F.

Table II tests the invention in a heavy (15 ppg) lab prepared drilling fluid at temperature intervals of initially after mixing hot rolled 150° F. for 16 hours, and static aged 300° F. for 16 hours. The test data illustrates the temperature tolerance of the invention. The compositions using Examples I and III (B) and III (C) maintain low yield point values after aging, and were able to produce a very low fluid loss (HTHP). The prior art polymers tested showed significant yield points and rheology increases, or significant fluid loss degradation.

Dynamic Temperature Stability

Example III A and Hostradril were tested using mud formulation III following the dynamic temperature aging test procedure described herein. Viscosity values were recorded from 100° to 350° F. and recorded in Table III below:

TABLE III

| Temperature F. | Example IIIA Viscosity (cps) | Hostadril Viscosity (cps) |
| --- | --- | --- |
| 100 | 280 | 245 |
| 150 | 220 | 235 |
| 200 | 280 | 260 |
| 250 | 400 | 580 |
| 300 | 300 | 2000+ |
| 350 | 360 | 2000+ |

Under these dynamic heat aging environments, mud formulations containing the terpolymer of Example III(A) showed centipoise viscosity significantly lower than the mud formulation containing the polymer Hostadril, especially in the 250° F. to 350° F. range.

What is claimed is:

1. In an aqueous lime or gypsum based drilling fluid composition containing a water dispersible fluid loss additive, the improvement which comprises:
said water dispersible fluid loss additive being comprised of a terpolymer of (1) from about 10 to about 75 weight percent of a vinyl containing alkyl or aromatic substituted sulfonate selected from the group consisting of 2-acrylamido-2-methylpropane sulfonic acid, sodium vinyl sulfonate and vinyl benzene sulfonate; (2) from about 10 to 76 weight percent of a nonionic monomer selected from the group consisting of acrylamide, N,N-dimethylacrylamide, N-vinyl pyrrolidone, N-vinyl acetamide and dimethylamino ethyl methacrylate; and (3) from about 1 to 60 weight percent of an unsaturated polybasic acid selected from the group consisting of itaconic acid, maleic acid, fumaric acid, citraconic acid, mesaconic acid, glutaconic acid, aconitic acid, $\alpha, \alpha'$-dimethylmuconic acid and 1-butene 2,3,4-tricarboxylic acid, said polymer having a weight average molecular weight of between about 200,000 and about 1,000,000, being in its free acid or partially or completely neutralized form, and being at least water dispersible.

2. The composition of claim 1 wherein said fluid loss additive is present in an amount in the range of from about 0.25% to about 6 parts per barrel.

3. The composition of claim 2 in which said terpolymer is in the form of at least one free acid or partial or complete sodium, potassium, ammonium, organic amine or quaternary ammonium salt, said salt containing one or more of sodium, potassium, ammonium, organic amine or quaternary ammonium cations.

4. The composition of claim 3 wherein said terpolymer contains from about 19 to about 70 weight percent of said vinyl containing alkyl or aromatic substituted sulfonate, from about 25 to about 76 weight percent of said nonionic monomer, and from about 1 to about 20% of said unsaturated polybasic acid.

5. The composition of claim 3 in which said terpolymer comprises about 64 weight percent 2-acrylamido-2-methylpropane sulfonic acid, about 30 weight percent acrylamide and about 6 weight percent itaconic acid.

6. The composition of claim 3 in which said terpolymer comprises about 54 weight percent 2-acrylamido-2-methylpropane sulfonic acid, about 39 weight percent acrylamide and about 7 weight percent itaconic acid.

7. The composition of claim 3 in which said terpolymer comprises about 55 weight percent 2-acrylamido-2-methylpropane sulfonic acid, about 40 weight percent acrylamide and about 5 weight percent itaconic acid.

8. The composition of claim 3 in which said terpolymer comprises about 39 weight percent 2-acrylamido-2-methylpropane sulfonic acid, about 54 weight percent acrylamide and about 7 weight percent itaconic acid.

9. The composition of claim 3 in which said terpolymer comprises about 70 weight percent 2-acrylamido-2-methylpropane sulfonic acid, about 25 weight percent acrylamide and about 5 weight percent itaconic acid.

10. The composition of claim 3 in which said terpolymer comprises about 19 weight percent 2-acrylamido-2-methylpropane sulfonic acid, about 76 weight percent acrylamide and about 7 weight percent itaconic acid.

11. The composition of claim 3 in which said terpolymer comprises about 23 weight percent 2-acrylamido-2-methylpropane sulfonic acid, about 70 weight percent acrylamide and about 7 weight percent itaconic acid.

12. The drilling fluid composition of claim 11 wherein the weight average molecular weight of said polymer is between about 300,000 to about 700,000.

13. In a method of drilling a well into a subterranean formation in which an aqueous line or gypsum based drilling fluid containing a water dispersible fluid loss additive is circulated into the well, the improvement in said circulating step which comprises: using as said water dispersible fluid loss additive at least one terpolymer formed from (1) about 10% to about 75% by weight of an acid monomer selected from the group consisting of 2-acrylamido-2-methylpropane sulfonic acid, sodium vinyl sulfonate and vinyl benzene sufonate; and (2) about 10% to 76% by weight of a nonionic monomer selected from the group consisting of acrylamide, N,N-dimethylacrylamide, N-vinyl pyrrlidone, N-vinyl acetamide and dimethylamino ethyl methacrylate and metal salts thereof; and about 1% to 60% by weight of unsaturated polybasic acid selected from the group consisting of itaconic acid, maleic acid, fumaric acid, citraconic acid, mesaconic acid, glutaconic acid, aconitic acid $\alpha, \alpha'$-dimethylmuconic acid and 1-butene 2,3,4-tricarboxylic acid, said polymer having an average molecular weight of between about 200,000 and about 1,000,000, being in its free acid or partially or completely neutralized form, and being at least water dispersible, said terpolymer being added to said drilling fluid in an amount sufficient to reduce fluid loss of said drilling fluid.

14. The method of claim 13 wherein said terpolymer is in the form of at least one free acid or partial or complete sodium, potassium, ammonium, organic amine or quaternary ammonium salt, said salt containing one or more of sodium, potassium, ammonium, organic amine or quaternary ammonium cations.

15. The method of claim 13 wherein said terpolymer comprises about 55% by weight 2-acrylamido-2-methylpropane sulfonic acid, about 40% by weight acrylamide or methacrylamide and about 5% by weight itaconic acid in the form of its free acid or partially or completely neutralized sodium, potassium, ammonium, organic amine or quaternary ammonium salt.

16. The method of claim 13 wherein said terpolymer comprises about 38% by weight 2-acrylamido-2-methylpropane sulfonic acid, about 57% by weight acrylamide or methacrylamide and about 5% by weight itaconic acid in the form of its free acid partially or completely neutralized sodium, potassium, ammonium, organic amine or quaternary ammonium salt.

17. The method of claim 13 wherein said terpolymer comprises about 18% by weight 2-acrylamido-2-methylpropane sulfonic acid, about 72% by weight acrylamide or methacrylamide and about 10% by weight itaconic acid in the form of its free acid or partially or completely neutralized sodium, potassium, ammonium, organic amine or quaternary ammonium salt.

18. The method of claim 13 wherein said terpolymer comprises about 36% by weight 2-acrylamido-2-methylpropane sulfonic acid, about 54% by weight acrylamide or methacrylamide and about 10% by weight itaconic acid in the form of its free acid or partially or completely neutralized sodium, potassium, ammonium, organic amine or quaternary ammonium salt.

* * * * *